(12) United States Patent
Molnar et al.

(10) Patent No.: US 8,682,914 B2
(45) Date of Patent: *Mar. 25, 2014

(54) METHOD AND SYSTEM FOR ROBUST FUTEXES

(75) Inventors: Ingo Molnar, Grünheide-Kagel (DE); Thomas Gleixner, Uhldingen-Muehlhofen (DE); Ulrich Drepper, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/335,325

(22) Filed: Dec. 22, 2011

(65) Prior Publication Data

US 2012/0096017 A1   Apr. 19, 2012

Related U.S. Application Data

(63) Continuation of application No. 12/861,431, filed on Aug. 23, 2010, now Pat. No. 8,095,550, which is a continuation of application No. 11/670,095, filed on Feb. 1, 2007, now Pat. No. 7,783,649.

(51) Int. Cl.
*G06F 17/00* (2006.01)
*G06F 17/30* (2006.01)

(52) U.S. Cl.
USPC ..... 707/755; 707/756; 707/791; 707/999.101

(58) Field of Classification Search
USPC .......... 707/755–757, 791, 793, 795, 999.101; 712/231
See application file for complete search history.

(56) References Cited

U.S. PATENT DOCUMENTS

| | | | |
|---|---|---|---|
| 7,117,481 B1 * | 10/2006 | Agesen et al. | 717/120 |
| 7,406,698 B2 | 7/2008 | Richardson | |
| 7,484,048 B2 | 1/2009 | Whitehouse | |
| 7,689,566 B1 | 3/2010 | Nieuwejaar et al. | |
| 2005/0193232 A1 | 9/2005 | Diehl | |
| 2007/0271450 A1 * | 11/2007 | Doshi et al. | 712/245 |
| 2008/0189282 A1 | 8/2008 | Molnar et al. | |

OTHER PUBLICATIONS

Franke, Hubertus, "Fuss, Futexes and Furwocks: Fast Userlevel Locking in Linux", Published: Jun. 29, 2002 at the Ottawa Linux Symposium, pertinent pp. 479-494 of Ottawa Linux Symposium (Jun. 26-Jun. 29, 2002).
Bohannon et al., "Recoverable User-Level Mutual Exclusion", AT&T Bell Laboratories, Oct. 1995.

\* cited by examiner

*Primary Examiner* — Marc Filipczyk
(74) *Attorney, Agent, or Firm* — Lowenstein Sandler LLP

(57) ABSTRACT

Systems and methods of managing primitives are disclosed. A data structure that is stored in user space is registered, wherein the data structure tracks a user controllable mutual exclusion primitive that is acquired by a process running in the user space, and wherein the user controllable mutual exclusion primitive serves as a lock on a resource provided by a computer system. A termination of the process is detected, wherein the process maintains the lock on the resource after termination and the data structure is searched to identify the user controllable mutual exclusion primitive that is acquired by the process that terminated. The user controllable mutual exclusion primitive is released if the user controllable mutual exclusion primitive is identified as being acquired by the process.

20 Claims, 5 Drawing Sheets

METHOD AND SYSTEM FOR ROBUST FUTEXES

CROSS-REFERENCE TO RELATED APPLICATIONS

This application is a continuation of application Ser. No. 12/861,431, titled "METHOD AND SYSTEM FOR ROBUST FUTEXES," filed on Aug. 23, 2010 now U.S. Pat. No. 8,095,550, which is a continuation of application Ser. No. 11/670,095, tilted "METHOD AND SYSTEM FOR ROBUST FUTEXES," filed Feb. 1, 2007, which issued as U.S. Pat. No. 7,783,649 on Aug. 24, 2010, all of which are incorporated by reference herein.

FIELD

This invention relates generally to futexes, more particularly to method and system for robust futexes.

DESCRIPTION OF THE RELATED ART

A futex is a fast, user-space mutual exclusion primitive. In the non-contended case, futexes can be obtained and released with no kernel involvement at all, thus futexes can be quite fast. When contention does happen, i.e., one process tries to obtain a futex held by another process, the kernel is called in to queue any waiting processes and wake them up when the futex becomes available. When queuing is not needed, however, the kernel maintains no knowledge of the futex, thus, keeping its overhead low.

There are disadvantages and drawbacks to keeping the kernel of the maintenance of the futexes. For example, if a process comes to an unexpected end while holding a futex, there is no way to release that futex and let other processes know about the problem. There have been several methods conceived to resolve this issue. However, none of these methods have been acceptable.

A fundamental problem to solve is that the kernel must, somehow, know about all futexes held by an existing process in order to release them. A conventional solution has been the addition of a system call to notify the kernel of lock acquisitions and release. This approach defeats one of the main advantages of futexes, their speed. This solution also adds a record-keeping and resource limiting problem to the kernel and suffers from problematic race conditions.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
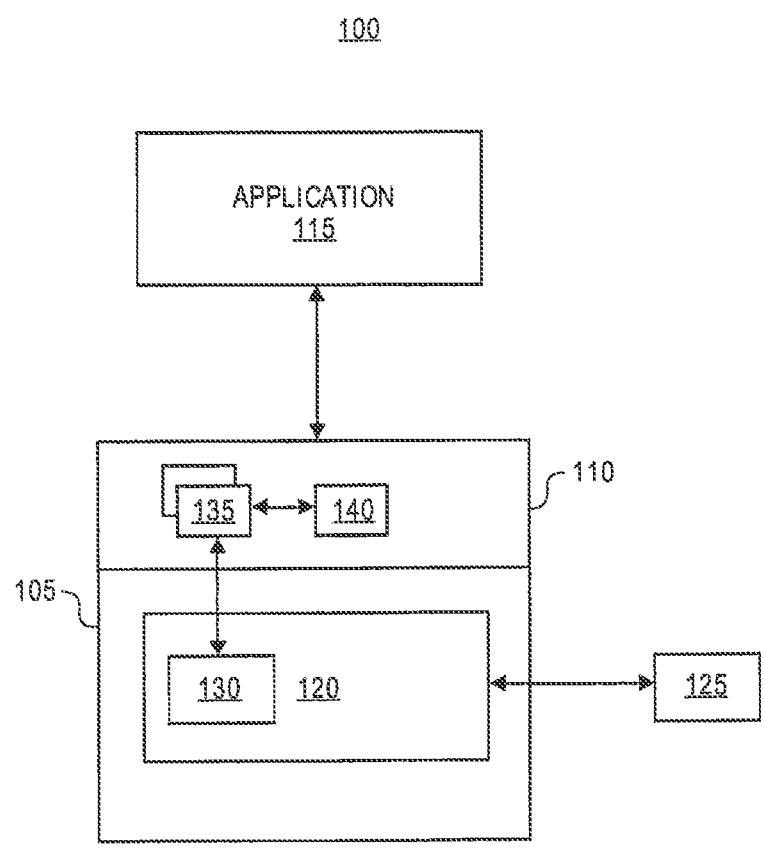
FIG. 1 illustrates an exemplary architecture of an embodiment of the invention.

For simplicity and illustrative purposes, the principles of the present invention are described by referring mainly to exemplary embodiments thereof. However, one of ordinary skill in the art would readily recognize that the same principles are equally applicable to, and can be implemented in, all types of operating systems that execute multiple applications, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate to a system and method for robust exclusion primitives that support an operating system. A fast, user-spaced mutual exclusion primitive (such as a futex) is a primitive or data type provided by a programming language. More particularly, a list of held futexes claimed by threads, processes, tasks, contexts, jobs, etc., is maintained in user space in a data structure such as a linked list. The kernel can determine the location of the data structure, i.e., futex data structure in the calling process's address space through a new system call as well as a second new system call to retrieve the information from the futex data structure.

In some embodiments, an application (or thread, process, task context, jobs, etc.) can register a linked list of futexes as the futex data structure. More particularly, the application can register a starting address of the futex data structure with a new system call, for example, sys_robust_list ( ). The application may invoke this system call an arbitrary number of times but is only invoked once during the lifetime of the thread. This system call will override whatever previous robust-list that was registered previously for the calling thread. However, in some instances, a process can consist of multiple threads each of which can register its own list.

When a futex is acquired by a thread, the acquired futex is linked into the acquiring thread's futex data structure. The length of the list or the number of held futexes can optionally be pre-defined.

When a futex that is held by a process or thread is released, the kernel can be configured to unlink the released futex from the futex data structure. Alternatively the unlinking can be done entirely by the process or thread itself. Subsequently, the futex is released.

Embodiments can also include a journaling mechanism. More specifically, a flag in a second data structure can be configured to indicate to the kernel that the calling process (or thread) is about to lock a selected futex and will be linked to the futex data structure. The second data structure, i.e., pending entry data structure, can be situated as a next entry from the starting address of the futex data structure of a thread. Accordingly, this can be considered a form of "poor man's journaling;" i.e., a mechanism that ensures that if an application crashes while it is manipulating a futex data structure, the locked futex is not lost.

When an application exits or ends, the kernel can be configured to examine the futex data structures of the application and the pending entry data structure to determine whether an existing entry belongs to the thread of the application that exited. If the locked futex belongs to that exiting thread, it is marked with the "owner died" bit and is unlocked, and any waiting process is awakened. The waking process can determine that the futex has been released under dubious circumstances and take whatever action it deems necessary (such as verifying the data structure protected by the lock for consistency, and terminating the task if inconsistencies are found, but continuing if the data structure is consistent).

FIG. 1 illustrates an exemplary environment 100 that supports the robust futex module in accordance with an embodiment. It should be readily apparent to those of ordinary skill in the art that the software environment 100 depicted in FIG. 1 represents a generalized schematic illustration and that other components may be added or existing components may be removed or modified.

As shown in FIG. 1, the software environment 100 can include an operating system 105. The operating system 105 can be a version of a Linux™, UNIX™ Windows™, or similar multi-tasking operating system. A run-time environment 110 can be configured to execute on the operating system 105 and represent a user-space. The run-time environment 110 can provide a set of software that supports the execution of applications/programs such as application 115. The run-time environment 110 can include an application program interface ("API", not shown) and a complementary API (not shown) within the application 115. The API can be configured to provide a set of routines that the application 115 uses to request lower-level services performed by the operating system 105. The operating system 105 can include a kernel 120. The kernel 120 may be configured to provide secure access to the underlying hardware of a processor.

The kernel 120 may also be configured to provide access to run-time libraries 125 for the operating system 105. The run-time libraries 125 can comprise multiple object files, which contain various library functions such as GNU C Standard Library ("glibc"), C++ Standard Library and other libraries known to those skilled in the art.

The kernel 120 can include a robust futex module 130. The robust futex module 130 can be configured to assist the kernel 120 in managing robust futexes being manipulated by applications, processes, jobs, tasks, threads, etc. A robust futex can be a fast, user-spaced mutual exclusion primitive or data type provided by a programming language. Accordingly, a number of robust futexes can be available for an application, process, thread, task, etc, in the normal course of execution.

As the robust futexes are claimed by a thread of the application, the application can maintain a futex data structure 135 through the robust futex module 130 that tracks the acquired futexes by a process, thread, etc. The futex data structure 135 can be implemented as a linked list, table or other similar indirect referencing structure known to those skilled in the art. As previously described, there can be multiple futex data structures in a user space due an application which can spawn multiple threads, each thread capable of creating its own futex data structure.

The application 115 can register a starting address in the user space of the futex data structure 135 with a new system call, for example, sys_robust_list ( ) in the robust futex module 130. However, this system call can be called an arbitrary number of times but is only invoked once during the lifetime of the thread. Moreover, this system call will override whatever futex data structure that was registered previously. In some instances, a process may have multiple threads attached to it. Accordingly, each process must register its own linked list of held futexes, i.e., its own futex data structures 135. Thus, when a futex is acquired by a thread (or application, process, etc.), the acquired futex can be linked into the acquiring thread's futex data structure 135. The length of the data structure or the number of held futexes can be pre-defined.

When a futex is released, the kernel 120 can invoke the robust futex module 130 to unlink the released futex from the data structure 135. Subsequently, the robust futex module 130 can release futex to be used by waiting processes, threads, tasks, etc.

The robust futex module 130 can also include a journaling mechanism. More specifically, a flag in a second data structure, i.e., a pending entry data structure 140, can be configured to indicate to the kernel 120 that the calling process (or thread) is about to lock a selected futex and will be linked to the private list of futexes stored in the futex data structure 135. The pending entry data structure 140 can be situated as a next entry linked to the starting address of the respective futex data structure 135. Accordingly, this can be considered a form of "poor man's journaling;" i.e., a mechanism that ensures that if an application crashes while it is manipulating a futex data structure 135, the locked futex is not lost.

When an application exits or ends, the kernel 120 can invoke the robust futex module 130 to examine the futex data structure 135 containing all the held futexes of the application and the pending entry data structure 140 to determine whether an existing entry belongs to the thread of the application that exited. If the locked futex belongs to that exiting thread, it is marked with the "owner died" bit and is unlocked, and any waiting process is invoked. The waking process can determine that the futex has been released under dubious circumstances and take whatever action it deems necessary (such as verifying the data structure protected by the lock for consistency, and terminating the task if inconsistencies are found, but continuing if the data structure is consistent).

Although FIG. 1 depicts the kernel 120 executing the robust futex module 130, in some embodiments the robust futex module 130 can be included in a run-time library 125 such as glibc.

Figure 2:
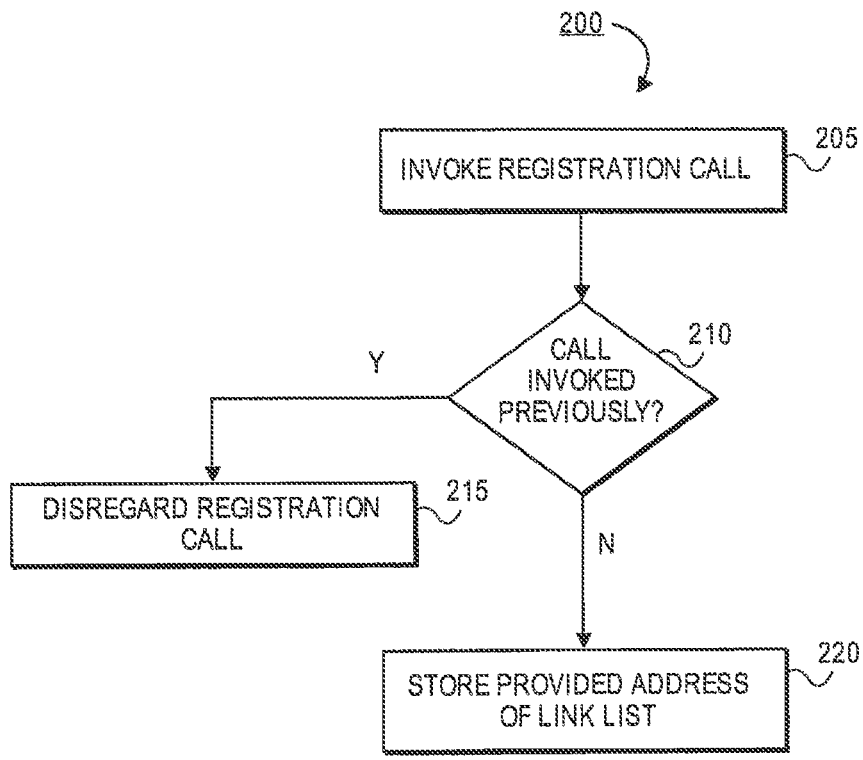
FIG. 2 illustrates an exemplary flow diagram implemented by a robust futex module in accordance with another embodiment.

FIG. 2 illustrates an exemplary flow diagram 200 implemented by the robust futex module 130. It should be readily apparent to those of ordinary skill in the art that the flow diagram 200 depicted in FIG. 2 represents a generalized schematic illustration and that other steps may be added or existing steps may be removed or modified.

As shown in FIG. 2, an application, such as application 115, can invoke the robust futex module 130 by executing a registration call function, e.g., sys_robust_list ( ) in step 205. The robust futex module 130 can be configured to determine if the registration call function was previously invoked by the calling application, process, thread, etc., in step 210. More particularly, as a non-limiting example, when the registration call function is initially invoked, the kernel 120 can set a flag to indicate the registration call function has invoked and is executing. Accordingly, the robust futex module 130 can examine this flag to determine whether or not the registration call function has been invoked. If the registration call function has been previously invoked, the robust futex module 130 can disregard the registration call function, in step 215. Otherwise, the robust futex module 130 can be configured to store the starting address of the futex data structure 135, in step 220. As noted previously, the futex data structure 135 can be implemented as a linked list, a table, a hash table or other similar indirect referencing mechanism.

Figure 3:
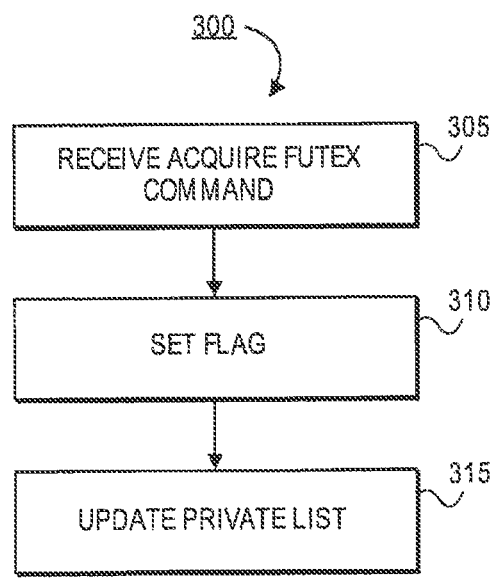
FIG. 3 illustrates another exemplary flow diagram implemented by the robust futex module in accordance with yet another embodiment.

FIG. 3 illustrates another exemplary flow diagram 300 implemented by the robust futex module 130. It should be readily apparent to those of ordinary skill in the art that the flow diagram 300 depicted in FIG. 3 represents a generalized schematic illustration and that other steps may be added or existing steps may be removed or modified.

As shown in FIG. 3, an application, process, thread, etc. (or generally, process), can invoke the robust futex module 130 to acquire a futex as part of normal execution of the associated software, in step 305. The robust futex module 130 can be configured to set a flag in the pending entry data structure 140, in step 310. Setting of this flag indicates that the selected futex is about to be selected. In step 315, the selected futex is added to the futex data structure 135 (or a private list) and the flag is reset in the pending entry data structure 140.

Figure 4:
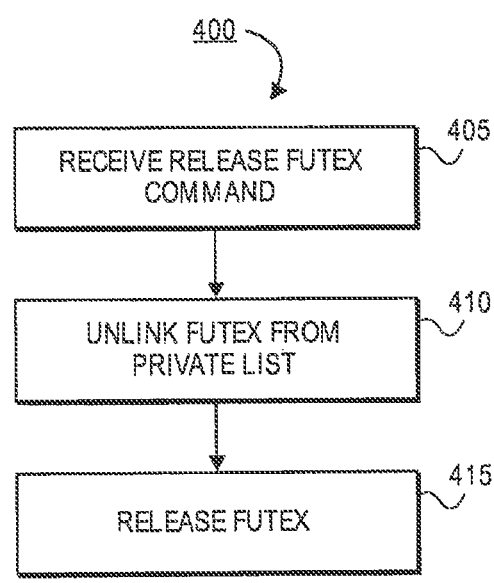
FIG. 4 depicts yet another exemplary flow diagram implemented by the robust futex module in accordance with yet another embodiment.

FIG. 4 illustrates yet another exemplary flow diagram 400 implemented by the robust futex module 130. It should be readily apparent to those of ordinary skill in the art that the flow diagram 400 depicted in FIG. 4 represents a generalized schematic illustration and that other steps may be added or existing steps may be removed or modified.

As shown in FIG. 4, an application, process, thread, etc., (more generally, a process) can be configured to issue a release command to a selected acquired futex in the futex data structure 135 as part of the normal execution of the application 115. More particularly, the application 115 can issue a release futex command, in step 405. The robust futex module 130 can be configured to remove the selected futex from the futex data structure 135, in step 410. The robust futex module 130 can then be configured to release the selected futex to the next waiting process, in step 415.

Figure 5:
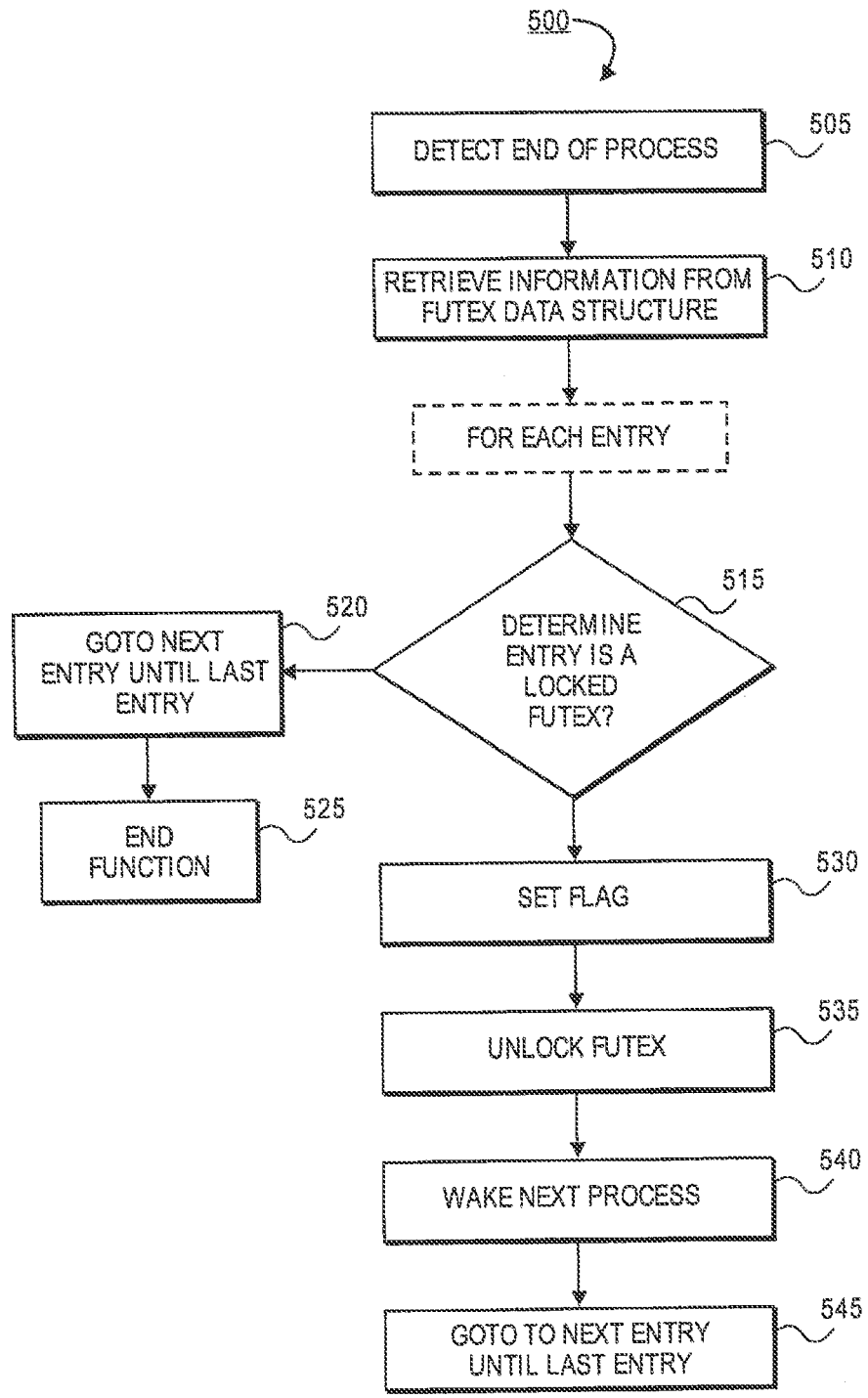
FIG. 5 depicts yet another exemplary flow diagram implemented by the robust futex module in accordance with yet another embodiment.

FIG. 5 illustrates yet another exemplary flow diagram 500 implemented by the robust futex module 130. It should be readily apparent to those of ordinary skill in the art that the flow diagram 500 depicted in FIG. 5 represents a generalized schematic illustration and that other steps may be added or existing steps may be removed or modified.

As shown in FIG. 5, the robust futex module 130 can be configured to detect the end or exiting of an application, process, thread, etc., (more generally a process), in step 505. The robust futex module 130 can be configured to execute a second system call, e.g., get_robust_list( ) to retrieve a private list of held futexes from the respective futex data structure 135 by the exiting process, in step 510.

In step 515, the robust futex module 130 can be configured to examine each entry in the private list for each. More particularly, the robust futex module 130 can be configured to determine if any entry holds a locked futex associated with the existing process. If a selected entry does not contain a locked futex, the robust futex module 130 proceeds to the next entry to the end of the private list, in step 520. Subsequently, the robust futex module 130 can terminate or enter a wait state, in step 525.

Otherwise, if the robust futex module 130 determines that an entry contains a locked futex, in step 515, the robust futex module 130 can be configured to set a flag for the selected futex indicating that the owner (exiting or ending process) has died, in step 530. Subsequently, the robust futex module 130 can be configured to unlock the futex, in step 535. The robust futex module 130 can then wake the next waiting process for the released futex and point the waking process to the flag indicating the owner "died" while holding the release futex, in step 540. Accordingly, the waiting process can take appropriate action to resolve any race conditions, data verification issues, etc. Subsequently, in step 545, the robust futex module 130 can be configured to the next entry to test for a locked futex until the last entry.

Figure 6:
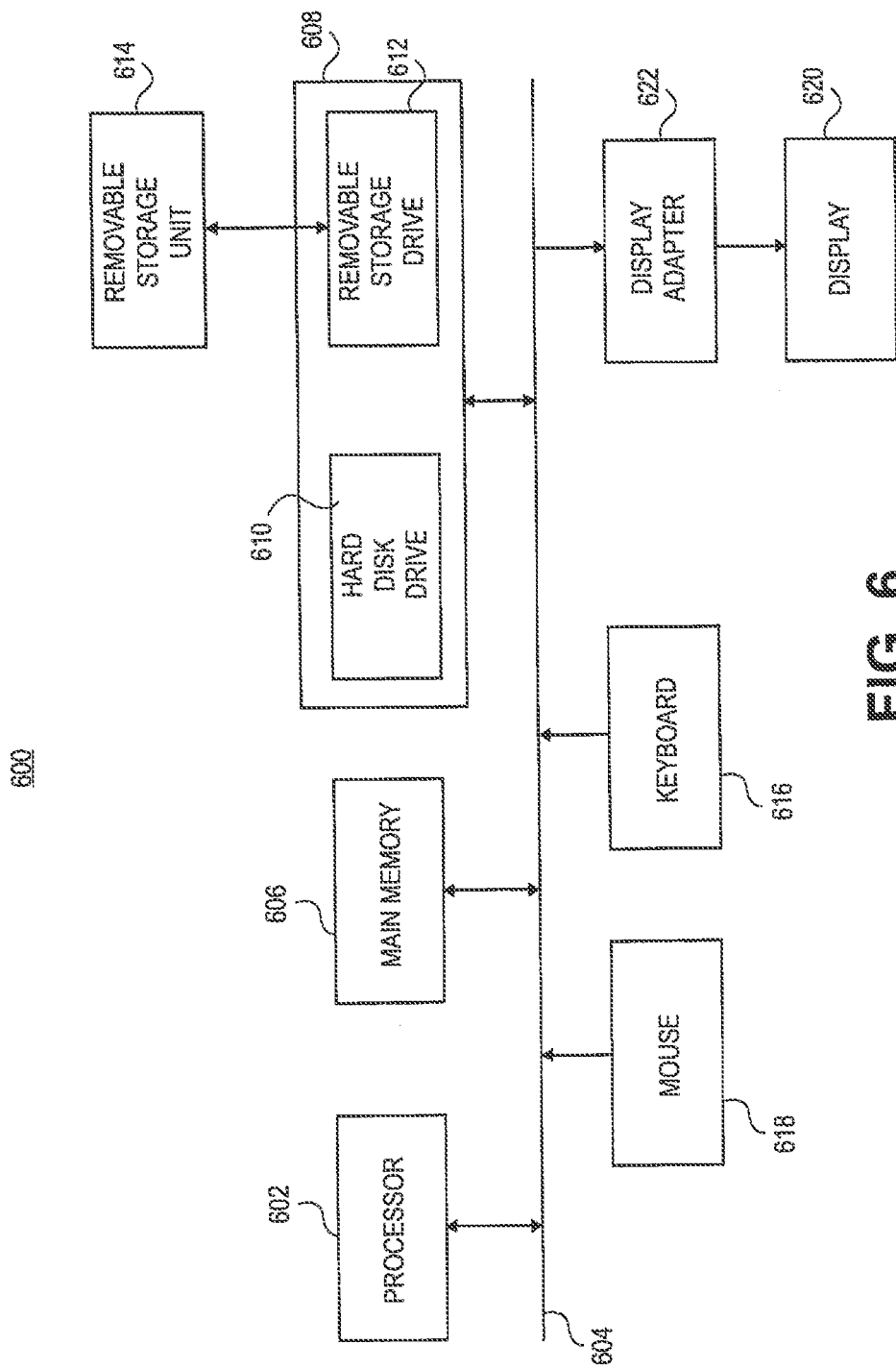
FIG. 6 depicts an exemplary computing platform to execute the robust futex module in accordance with yet another embodiment.

FIG. 6 illustrates an exemplary block diagram of a computing platform 600 where an embodiment of the robust futex module 130 can be practiced. The functions of the embodiments of the present invention of the robust futex module may be implemented in program code and executed by the computing platform 600. The robust futex module can be implemented in computer languages such as PASCAL, C, C++, JAVA, etc.

As shown in FIG. 6, the computer system 600 includes one or more processors, such as processor 602 that provide an execution platform for embodiments of the robust futex module. Commands and data from the processor 602 are communicated over a communication bus 604. The computer system 600 also includes a main memory 606, such as a Random Access Memory (RAM), where the robust futex module can be executed during runtime, and a secondary memory 608. The secondary memory 608 includes, for example, a hard disk drive 610 and/or a removable storage drive 612, representing a floppy diskette drive, a magnetic tape drive, a compact disk drive, etc., where a copy of a computer program embodiment for the robust futex module can be stored. The removable storage drive 612 reads from and/or writes to a removable storage unit 614 in a well-known manner. A user interfaces with the optimal run-time linker with a keyboard 616, a mouse 618, and a display 620. A display adapter 622 interfaces with the communication bus 604 and the display 620. The display adapter also receives display data from the processor 602 and converts the display data into display commands for the display 620.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
    registering a data structure that is stored in user space, wherein the data structure tracks a user controllable mutual exclusion primitive that is acquired by a process running in the user space, wherein a portion of the user controllable mutual exclusion primitive is stored in user space, and wherein the user controllable mutual exclusion primitive serves as a lock on a resource provided by a computer system;

detecting, by a processor, a termination of the process, wherein the process maintains the lock on the resource after termination;

searching the data structure to identify the user controllable mutual exclusion primitive that is acquired by the process that terminated; and releasing the user controllable mutual exclusion primitive if the user controllable mutual exclusion primitive is identified as being acquired by the process.

2. The method of claim 1, further comprising:
setting a flag for the user controllable mutual exclusion primitive; and
notifying a waiting computer process waiting for the user controllable mutual exclusion primitive, wherein the waiting computer process determines that the flag is set and resolves race conditions associated with the resource locked by the user controllable mutual exclusion primitive.

3. The method of claim 2, wherein notifying a waiting computer process further comprises waking the waiting computer process.

4. The method of claim 1, further comprising:
selecting a free user controllable mutual exclusion primitive from a plurality of user controllable mutual exclusion primitives in response to a request by the process, wherein the process acquires the free user controllable mutual exclusion primitive; and
linking the free user controllable mutual exclusion primitive acquired by the process to the data structure.

5. The method of claim 4, further comprising:
providing a pending entry data structure; and
setting a pending entry flag in the pending entry data structure indicating that the process is about to acquire the free user controllable mutual exclusion primitive.

6. The method of claim 5, further comprising linking the pending entry data structure to the data structure.

7. The method of claim 5, further comprising:
resetting the pending entry flag in the pending entry data structure after linking the user controllable mutual exclusion primitive acquired by the process to the data structure.

8. The method of claim 5, further comprising:
searching the pending data structure for the user controllable mutual exclusion primitive;
setting the flag if the user controllable mutual exclusion primitive is found in the data structure or if the pending entry flag in the pending entry data structure is set; and
notifying a waiting computer process waiting for the user controllable mutual exclusion primitive, wherein the waiting computer process determines that the flag is set and resolves race conditions associated with the resource locked by the user controllable mutual exclusion primitive.

9. The method of claim 1, wherein registering the data structure further comprises:
receiving a system call from the process to register the data structure with a kernel; and
executing a function call to the kernel to determine whether the data structure has been registered.

10. The method of claim 1, wherein releasing the user controllable mutual exclusion primitive further comprises:
unlinking the user controllable mutual exclusion primitive from the data structure.

11. An apparatus comprising:
a memory to store a data structure stored in user space, wherein the data structure is to track a user controllable mutual exclusion primitive that is acquired by a process running in the user space, wherein a portion of the user controllable mutual exclusion primitive is stored in user space, and wherein the user controllable mutual exclusion primitive serves as a lock on a resource provided by a computer system; and
a processor device, coupled to the memory; and
a mutual exclusion module, executable by the processor to:
register the data structure;
detect a termination of the process, wherein the process maintains the lock on the resource after termination;
search the data structure to identify the user controllable mutual exclusion primitive that is acquired by the process that terminated; and
release the user controllable mutual exclusion primitive if the user controllable mutual exclusion primitive is identified as being acquired by the process.

12. The apparatus of claim 11, wherein the mutual exclusion module is further to:
set a flag for the user controllable mutual exclusion primitive; and
notify a waiting computer process waiting for the user controllable mutual exclusion primitive, wherein the waiting computer process determines that the flag is set and resolves race conditions associated with the resource locked by the user controllable mutual exclusion primitive.

13. The apparatus of claim 11, wherein the mutual exclusion module is further to:
select a free user controllable mutual exclusion primitive from a plurality of user controllable mutual exclusion primitives in response to a request by the process, wherein the process acquires the free user controllable mutual exclusion primitive; and
link the free user controllable mutual exclusion primitive acquired by the process to the data structure.

14. The apparatus of claim 13, wherein the mutual exclusion module is further to:
provide a pending entry data structure;
set a pending entry flag in the pending entry data structure indicating that the process is about to acquire the free user controllable mutual exclusion primitive;
link the pending entry data structure to the data structure; and
reset the pending entry flag in the pending entry data structure after linking the user controllable mutual exclusion primitive to the data structure.

15. The apparatus of claim 14, wherein the mutual exclusion module is further to:
search the pending entry data structure for the user controllable mutual exclusion primitive;
set a flag if the user controllable mutual exclusion primitive is found in the data structure or if the pending entry flag in the pending entry data structure is set; and
notify a waiting computer process waiting for the user controllable mutual exclusion primitive, wherein the waiting computer process determines that the flag is set and resolves race conditions associated with the resource locked by the user controllable mutual exclusion primitive.

16. A non-transitory machine-readable storage medium including data that, when accessed by a processor, cause the processor to perform operations comprising:
  registering a data structure that is stored in user space, wherein the data structure tracks a user controllable mutual exclusion primitive that is acquired by a process running in the user space, wherein a portion of the user controllable mutual exclusion primitive is stored in user space, and wherein the user controllable mutual exclusion primitive serves as a lock on a resource provided by a computer system;
  detecting, by the processor, a termination of the process, wherein the process maintains the lock on the resource after termination;
  searching the data structure to identify the user controllable mutual exclusion primitive that is acquired by the process that terminated; and
  releasing the user controllable mutual exclusion primitive if the user controllable mutual exclusion primitive is identified as being acquired by the process.

17. The non-transitory machine-readable storage medium of claim 16, wherein the operations further comprise:
  setting a flag for the user controllable mutual exclusion primitive;
  notifying a waiting computer process waiting for the user controllable mutual exclusion primitive, wherein the waiting computer process determines that the flag is set and resolves race conditions associated with the resource locked by the selected user controllable mutual exclusion primitive.

18. The non-transitory machine-readable storage medium of claim 16, wherein the operations further comprise:
  selecting a free user controllable mutual exclusion primitive from a plurality of user controllable mutual exclusion primitives in response to a request by the process, wherein the process acquires the free user controllable mutual exclusion primitive; and
  linking the free user controllable mutual exclusion primitive acquired by the process to the data structure.

19. The non-transitory machine-readable storage medium of claim 18, wherein the operations further comprise:
  providing a pending entry data structure;
  setting a pending entry flag in the pending entry data structure indicating that the process is about to acquire the free user controllable mutual exclusion primitive;
  linking the pending entry data structure to the data structure; and
  resetting the pending entry flag in the pending entry data structure after linking the user controllable mutual exclusion primitive to the data structure.

20. The non-transitory machine-readable storage medium of claim 19, wherein the operations further comprise:
  searching the pending entry data structure for the user controllable mutual exclusion primitive; and
  setting the first flag if the user controllable mutual exclusion primitive is found in the data structure or if the pending entry flag in the pending entry data structure is set.

* * * * *